UNITED STATES PATENT OFFICE 2,365,936

POLY-β-CYANOETHYL INDENE AS AN INSECTICIDE

Herman A. Bruson, Philadelphia, Pa., assignor to Röhm & Haas Company, Philadelphia, Pa., a corporation of Delaware No Drawing. Application April 10, 1942,
Serial No. 438,419

2 Claims. (Cl. 167—30)

The invention relates to insecticidal compositions containing poly-β-cyanoethylated indene as an active toxicant.

It has been found that poly-β-cyanoethylated indene is an effective stomach poison and repellent against insects on growing plants, and, while active insecticidally, shows no phytocidal action.

The preparation of poly-β-cyanoethyl indene is described in my copending application Serial No. 391,501, filed May 2, 1941, which, on April 21, 1942, issued as United States Patent No. 2,280,058. As there shown, indene reacts with acrylonitrile in the presence of an alkaline condensing agent, such as sodium methylate, sodium or potassium hydroxide, a quaternary ammonium hydroxide, or the like, to add two or three β-cyanoethyl groups. The crude product obtained contains a mixture of poly-β-cyanoethylated indenes which may, if desired, be separated and purified. Such separation is not, however, necessary as the crude product is also insecticidally active and is also safe for use on plant foliage.

Not only may the simple poly-β-cyanoethylated indene derivatives be used as insecticides but also the poly-β-cyanoethylated alkyl, aryl or aralkyl indenes, poly-β-cyanoethyl diindene (hydrindyl indene), and poly-β-cyanoethyl indenes having nitro, bromo, chloro, hydroxy, or alkoxy groups as additional substituents of the phenyl ring.

Poly-β-cyanoethyl indene may be applied to plants from sprays or dusts. It is most conveniently extended on an inert carrier before dilution to a convenient and economical concentration, as with water or with a solid diluent, such as clay. The poly-β-cyanoethyl indene may be mixed with such a carrier as talc, wanut shell flour, clay, magnesium carbonate, chalk, or similar material and the resulting mixture finely ground. The poly-β-cyanoethyl indene may also be dissolved in a solvent, such as ethyl alcohol, acetone, or other volatile organic liquid, and the solution thereof applied to a carrier. The solvent may then be evaporated, leaving the carrier coated with the active toxicant. The toxicant and carrier may then be used in aqueous sprays which may desirably also contain wetting agents and/or sticking agents, as is now conventional practice. When the toxicant is to be applied from a dust, the active agent may be mixed with diluents, as has been indicated, and also with dispersing and sticking agents, if desired.

Poly-β-cyanoethyl indene may also be applied from aqueous emulsions which may be prepared with the aid of emulsifying agents and, if desired, organic solvents, which are useful as extenders, since poly-β-cyanoethylated indene is generally applied at very low concentrations.

A typical dust may be prepared from one part of poly-β-cyanoethylated indene, crude or purified, one part of spreader, and 98 parts of talc. Powdered milk or calcium caseinate is a useful spreader.

A typical spray may be prepared by dissolving one part poly-β-cyanoethylated indene in ethanol and mixing the solution with two parts of magnesium carbonate. The sludge is then ground and heated to drive off the alcohol. The dried material is then mixed with one-half part of a wetting agent such as cetyl dimethyl benzyl ammonium chloride, and 96.5 parts of water, and applied as a spray.

Such a spray containing 1% of recrystallized tri-β-cyanoethyl indene was applied to bean plants infested with Mexican bean beetle larvae. At the end of 24 hours results were observed. There was no evident feeding and no injury from the spray. A control of 80% was obtained with at least half of the Mexican bean beetle larvae which had fallen from the plants dead at this time. A parallel test with magnesium arsenate at 8 lbs. per 100 gallons of spray gave an 80% control, but permitted considerable feeding.

A second spray was then applied with the tri-β-cyanoethyl indene reduced to one-half percent. At the end of 24 hours it was found that 70% of the Mexican bean beetle larvae were dead, and 20% were moribund, giving a control of 90%. There was no injury to the plant and no feeding had occurred. From a third spray containing only 0.25% of tri-β-cyanoethyl indene a control of 90% was also obtained with a kill of 60%. There was no injury to the plant and only slight feeding had occurred. A control experiment run simultaneously with magnesium arsenate at 8 lbs. per 100 gallons gave a control of only 60%.

Similar sprays prepared from the crude reaction product of indene and acrylonitrile, containing both di- and tri-β-cyanoethylated indene, were applied to bean plants infested with Mexican bean beetle larvae. At 0.2% (1.6 lbs. per 100 gallons) a kill of 70% was obtained in 24 hours. There was no injury to the plant and no feeding was evident. Under the same conditions a spray containing 0.1% of the crude poly-β-cyanoethylation products (0.8 lb. per 100 gallons) gave a control of 70% including a kill of 40%. Control experiments carried on simultaneously with magnesium arsenate at 8 lbs. per 100 gallons of spray gave a control of 80% but with only a 30% kill and some feeding.

It is evident that remarkably low concentrations of poly-$\beta$-cyanoethyl indene effectively control Mexican bean beetle larvae. By a slight increase over the minimum concentration tested the plants are protected from the ravages of the insects. This protection appears to be not only due to the high degree of effectiveness in destroying the insects but also to a repellent action.

The poly-$\beta$-cyanoethylated indene products were also tested against codling moth larvae on apples. At 0.8 lb. per 100 gallons a control of 58% was obtained. To obtain a comparable control with lead arsenate a spray containing 3 lbs. of this arsenate along with 3 lbs. of lime per 100 gallons was required.

While poly-$\beta$-cyanoethyl indene has been shown as the sole toxicant in various insecticidal compositions, it may also be used in conjunction with other insecticidal agents or fungicides, such as rotenone, pyrethrins, nicotine, organic thiosyanates, arsenates, cuprous oxide, copper oxychloride, oils, etc. Such mixtures give a plurality of effects or a single improved effect.

Poly-$\beta$-cyanoethyl indene is insecticidally active at low concentrations, is stable, and remains effective over long periods of time in the field. It has repellent action as well as lethal action against insects. At the same time the cyanoethylated indene appears to be harmless to higher forms of life and to lack phytocidal action.

I claim:

1. An insecticidal composition comprising as an active agent poly-$\beta$-cyanoethyl indene and a carrier.

2. An insecticidal composition comprising as an active agent tri-$\beta$-cyanoethyl indene and a carrier.

HERMAN A. BRUSON.